US008452501B1

(12) United States Patent
Lange et al.

(10) Patent No.: US 8,452,501 B1
(45) Date of Patent: May 28, 2013

(54) SUGAR CANE HARVESTER AUTOMATIC CUTTER HEIGHT CONTROL

(75) Inventors: Arthur F Lange, Sunnyvale, CA (US); Eric A Wuestefeld, Westminster, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 35 days.

(21) Appl. No.: 13/292,329

(22) Filed: Nov. 9, 2011

(51) Int. Cl.
G06F 7/00 (2006.01)
G06F 17/00 (2006.01)
G06F 19/00 (2006.01)

(52) U.S. Cl.
USPC .................. 701/56; 56/13.6; 701/50; 701/58; 701/65

(58) Field of Classification Search
USPC ............................ 56/13.6; 701/50, 56, 58, 65
See application file for complete search history.

(56) References Cited

U.S. PATENT DOCUMENTS

| | | | | |
|---|---|---|---|---|
| 3,415,044 A * | 12/1968 | Munson | | 56/119 |
| 4,065,912 A * | 1/1978 | Quick | | 56/13.9 |
| 4,152,883 A * | 5/1979 | Quick | | 56/13.9 |
| 4,332,126 A * | 6/1982 | Van Auwelaer et al. | | 56/10.2 R |
| 4,414,792 A * | 11/1983 | Bettencourt et al. | | 56/10.2 E |
| 5,019,983 A * | 5/1991 | Schutten et al. | | 701/50 |
| 5,138,819 A | 8/1992 | Andre | | |
| 5,191,759 A * | 3/1993 | Baker | | 56/500 |
| 5,379,577 A * | 1/1995 | Caillouet | | 56/14.3 |
| 5,414,981 A | 5/1995 | Landry | | |
| 5,463,856 A * | 11/1995 | Beckwith | | 56/62 |
| 5,535,577 A | 7/1996 | Chmielewski | | |
| 5,666,793 A * | 9/1997 | Bottinger | | 56/10.2 R |
| 5,704,200 A * | 1/1998 | Chmielewski et al. | | 56/10.2 E |
| 5,794,421 A * | 8/1998 | Maichle | | 56/10.2 E |
| 5,886,662 A * | 3/1999 | Johnson | | 342/25 A |
| 5,937,621 A * | 8/1999 | Eggenhaus | | 56/10.2 E |
| 5,961,573 A * | 10/1999 | Hale et al. | | 701/50 |
| 6,041,582 A * | 3/2000 | Tiede et al. | | 56/10.2 A |
| 6,062,009 A | 5/2000 | Caillouet | | |
| 6,068,059 A * | 5/2000 | Bajema et al. | | 171/130 |
| 6,076,340 A | 6/2000 | Fowler | | |
| 6,167,337 A * | 12/2000 | Haack et al. | | 701/50 |
| 6,209,669 B1 | 4/2001 | Young | | |
| 6,272,819 B1 | 8/2001 | Wendte | | |
| 6,363,700 B1 | 4/2002 | Fowler | | |
| 6,381,937 B1 * | 5/2002 | Nelson | | 56/33 |
| 6,530,197 B1 | 3/2003 | Christensen | | |
| 6,745,550 B1 | 6/2004 | Hinds | | |
| 6,791,488 B2 * | 9/2004 | Diekhans et al. | | 342/22 |
| 6,813,873 B2 * | 11/2004 | Allworden et al. | | 56/10.2 E |
| 6,834,483 B2 | 12/2004 | Harvey | | |
| 6,845,326 B1 * | 1/2005 | Panigrahi et al. | | 702/22 |

(Continued)

OTHER PUBLICATIONS

Page, R.L. and Woods, G.S., "Sensing of Ground Level through Sugar Cane using Microwave Techniques", Workshop on Applications of Radio Science (WARs '00), La Trobe University, Apr. 27-29, 2000. http://www.ips.gov.au/IPSHosted/NCRS/wars/wars2000/comma/page.doc.*

(Continued)

Primary Examiner — Calvin Cheung
(74) Attorney, Agent, or Firm — NUPAT, LLC; Morrison Ulman

(57) ABSTRACT

Sugar cane harvester automatic cutter height control systems maintain consistent cutter heights even as a harvesting machine traverses changing field conditions. After an operator chooses an initial cutting height the automatic systems maintain that height even as ground conditions change.

7 Claims, 12 Drawing Sheets

U.S. PATENT DOCUMENTS

| | | | | |
|---|---|---|---|---|
| 6,871,483 B1* | 3/2005 | Panoushek | ............... | 56/10.2 E |
| 6,883,299 B1* | 4/2005 | Gramm | ............... | 56/10.2 E |
| 7,310,931 B2 | 12/2007 | Gramm | | |
| 7,401,455 B1 | 7/2008 | Cleodolphi | | |
| 7,603,837 B2 | 10/2009 | Ehrhart | | |
| 7,707,811 B1* | 5/2010 | Strosser | ............... | 56/10.2 E |
| 7,748,489 B2* | 7/2010 | Sheidler et al. | ............... | 180/308 |
| 2003/0089093 A1* | 5/2003 | Paquet et al. | ............... | 56/10.2 A |
| 2008/0155953 A1* | 7/2008 | Cleodolphi | ............... | 56/10.2 E |
| 2009/0193777 A1* | 8/2009 | Wendling | ............... | 56/10.2 R |
| 2012/0110968 A1* | 5/2012 | Hinds | ............... | 56/53 |
| 2012/0240544 A1* | 9/2012 | Hinds | ............... | 56/102 |

OTHER PUBLICATIONS

Woods, G.S., Page, R.L., and Maskell D.L., "Ground Height Detection Sensor for Control of Harvesting Equipment" 2002 Asia Pacific Microwave Conference, Kyoto, Japan, Nov. 19-22, 2002. http://www.ece.jcu.edu.au/Staff/Profiles/graham-woods/Research/GDS_Harvester.pdf.*

Page, Rayner Luke, "Ground detection sensor for cane harvester base-cutter height control", Masters (Research) thesis, James Cook University, Queensland, Australia, Nov. 2006.

* cited by examiner

Fig. 1A      HARD AREA      SOFT AREA

Fig. 1B      HARD AREA      SOFT AREA

HARD AREA

SOFT AREA

SUGAR CANE HARVESTER AUTOMATIC CUTTER HEIGHT CONTROL

TECHNICAL FIELD

The disclosure is generally related to automatic control systems for sugar cane harvesters.

BACKGROUND

Two billion tons of sugar cane are produced worldwide each year, about half of which are harvested by hand. Workers set fire to sugar cane fields to burn dry leaves and kill any lurking venomous snakes when preparing to harvest by hand. The harvesters then cut the sugar cane just above ground level using machetes. Sugar cane harvesting machines eliminate the need to burn fields and work about 100 times faster than hand harvesters, but the machines require initial capital investment and operator training.

Whether by hand or by machine, sugar cane must be cut at the proper height above ground. Cutting cane stalks too high leaves valuable sugar behind as the highest sugar concentration is found at the bottom of the stalk. Cutting too high can also shatter stalks, leaving plants susceptible to disease. Cutting cane stalks too low (sometimes below ground level) damages ratoons and dulls cutter blades. Contamination by dirt accumulated when cutting too low also reduces the amount of raw sugar that can be produced per ton of sugar cane and therefore lowers the price paid to farmers by sugar mills. Hence, the overall efficiency of sugar production from sugar cane is reduced whenever cane stalks are cut above or below an optimum height. Just a centimeter or two too high or low makes an economically significant difference.

Some existing automatic base cutter height control systems for sugar cane harvesting machines rely on cutter hydraulic pressure. Lower cutting height is sensed as an increase in pressure while higher height is sensed as a decrease. Unfortunately, these systems do not work well. Modern harvesters are so powerful that cutting through dirt does not make a great difference in hydraulic pressure. Further, the best sugar cane, having the most sugar content, is thicker and harder to cut than average sugar cane and therefore requires greater cutter pressure. Thus, automatic base cutter height control systems based on cutter hydraulic pressure cannot easily distinguish between cutter blades in dirt and cutting high yield cane.

Sugar cane harvesting machines also employ a top cutter to remove leaves and cane flowers from the tops of stalks. This reduces the amount of contaminating material sent to the sugar mill and eliminates the need to burn a field before harvesting it. Similar to base cutting, but without such tight tolerances, top cutter height must be maintained within an optimum range. If the top cutter cuts too low, sugar containing cane is wasted. If it cuts too high, contamination sent to the mill may be unnecessarily high.

Hence, reliable and accurate systems for automatic control of base cutter and/or top cutter height in sugar cane harvesting machines are needed.

BRIEF DESCRIPTION OF THE DRAWINGS

FIGS. 1A-1D show a sugar cane harvesting machine working in both hard and soft areas of a field.

DETAILED DESCRIPTION

Introduction

Figure 1C:
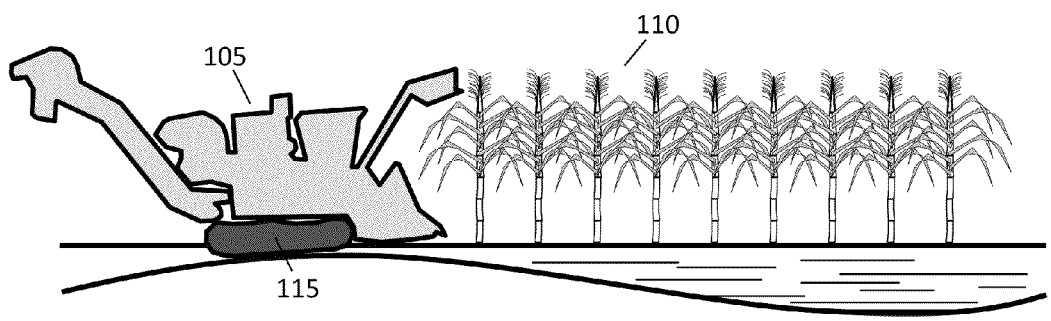
Figure 1C:
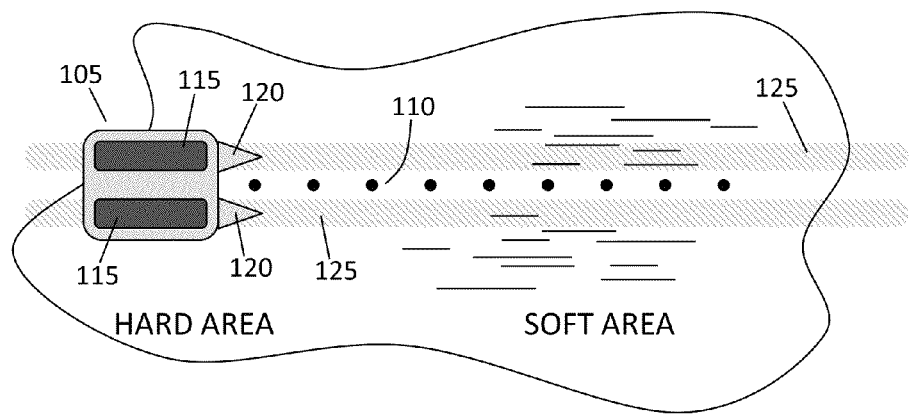
Figure 1C:
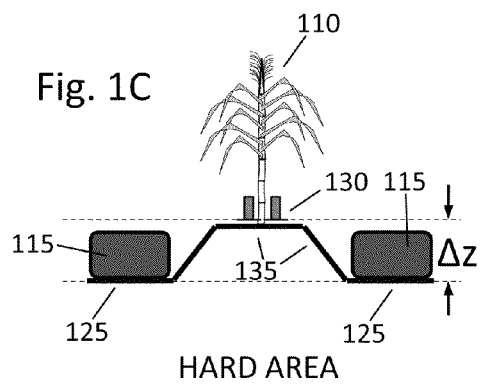

Sugar cane harvesting is a messy job. A typical 30,000-40,000 pound harvesting machine is about 8 feet wide, 13 feet high and as much as 52 feet long from topper in the front to elevator bin flap in the rear. Mature sugar cane plants are around 12 to 14 feet high, so a machine operator cannot see more than a few feet ahead while harvesting. The machine mows sugar cane row by row, chopping stalks into roughly foot-long billets which are collected in a trailer towed alongside by a tractor. Streams of dirt and sugar cane leaves spew out of the machine onto the ground.

A sugar cane harvesting machine operator must make critical cutter height adjustments amid dirt, dust and low visibility. Furthermore, field conditions are constantly changing. A heavy machine tends to sink into soft ground and lift up when ground becomes harder.

The sugar cane harvester automatic cutter height control systems described below maintain consistent cutter heights even as a harvesting machine traverses changing field conditions. After an operator chooses an initial cutting height the automatic systems maintain that height even as ground conditions change. The operator may change the height to be maintained whenever he wishes.

Base Cutter Control

FIGS. 1A-1D show a sugar cane harvesting machine working in both hard and soft areas of a field. The harvester shown in FIGS. 1A-1D has tracks, as opposed to wheels, and much of the following discussion refers to tracked harvesters. However, the automatic cutter height control systems described below work equally well with tracked or wheeled vehicles.

In FIG. 1A, harvesting machine 105 is shown harvesting sugar cane 110. The machine moves on tracks 115 from a hard area to a soft area of the field. FIG. 1B is a top view of the scene shown in FIG. 1A; however, in FIG. 1B harvester 105 is represented more abstractly to emphasize the position of tracks 115 and row separators 120 while leaving out topper, elevator and other details. In FIG. 1B, harvester 105 travels in ruts 125 when harvesting sugar cane plants 110. Row separators 120 pass over ruts 125.

Figure 1D:
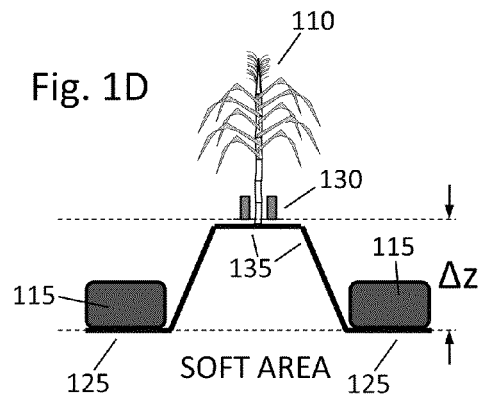

FIGS. 1C and 1D are front views of harvester 105 in hard and soft ground, respectively. In FIGS. 1C and 1D, only base cutter 130 and tracks 115 of the harvester are shown; all other details are omitted for clarity. The harvester lifts in hard ground (e.g. FIG. 1C) and sinks in soft ground (e.g. FIG. 1D). Sugar cane plant 110 is cut at the same height (i.e. the same part of its stalk) in hard (FIG. 1C) and soft (FIG. 1D) ground, but the height, $\Delta z$, of the cutter blades above tracks 115 is different in the two cases. In soft ground (FIG. 1D) the tracks 115 of the harvester sink with respect to the furrow 135 where sugar cane 110 is planted. The systems described herein maintain constant base cutter height above the furrow even when a harvester's tracks sink in soft ruts or lift in hard ruts.

It would be convenient if the height of base cutter 130 with respect to furrow 135 could be easily measured. However, dirt, mud and debris associated with cutting make such measurements difficult. Therefore the automatic base cutter height control described herein monitors cutter height with respect to the ruts and machine body height with respect to the furrow. The proper cutter height with respect to the machine body may then be maintained. FIGS. 1C and 1D show a furrow 135 that is higher than ruts 125. In other cases, however, the furrow may be lower than the ruts. All of the systems and operating principles discussed herein are applicable to either situation.

In a typical sugar cane harvesting machine, the row separators (also called crop separators) and base cutter mechanism are fixed with respect to each other. Their height with respect to the machine body is controlled by hydraulic actuators. Thus the row separators and base cutter mechanism may be raised or lowered together with respect to the machine body. The harvesting machine travels on tracks, but the height of the machine body over the tracks is fixed. Finally, the row separators are located in line with the tracks; i.e. they travel over the ruts.

The row separators offer protection for a set of ultrasonic height sensors that measure the height of the row separator/base cutter unit over ruts. A second set of ultrasonic sensors, mounted at the back of the machine near the elevator slew table, measures the height of the machine body with respect to furrows. When the machine body height changes with respect to the furrows, the row separator/base cutter height is adjusted to compensate. For example, when the machine sinks in soft ground, the machine body height over the furrow decreases. In this case, the row separator/base cutter unit is raised by the same amount that the machine body height decreased.

Figure 2:
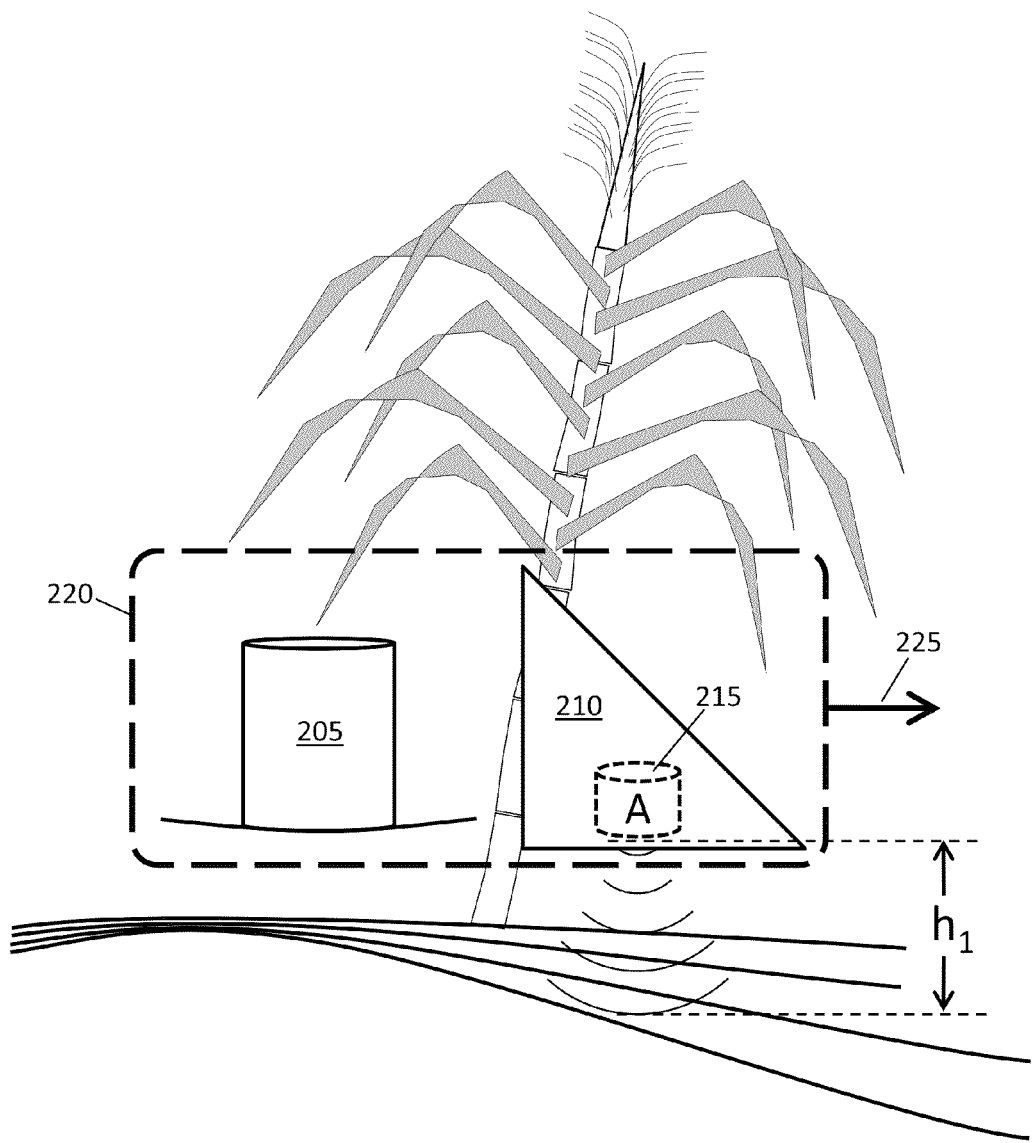
FIG. 2 is a side view of a sugar cane harvesting machine showing a base cutter, crop separator and crop separator ultrasonic height sensor.

FIG. 2 is a side view of a sugar cane harvesting machine showing a base cutter, crop separator and crop separator ultrasonic height sensor. FIG. 2 is highly schematic; base cutter 205, row separator 210 and ultrasonic sensor 215 are the only parts of the harvesting machine that are illustrated. Dashed rectangle 220 indicates that these parts are fixed with respect to each other. Arrow 225 indicates the direction of travel. Ultrasonic sensor 215, also called an "A" sensor, measures the height, $h_1$, of row separator 210 above a rut in which the machine's tracks travel. Ultrasonic "A" sensor 215 is protected from dirt and debris because it is mounted inside row separator 210. Sensor 215 has a clear view of the ground underneath it, but row separator 210 keeps it from being fouled by sugar cane leaves and its position ahead of cutter 205 reduces contamination from mud and dirt.

Figure 3:
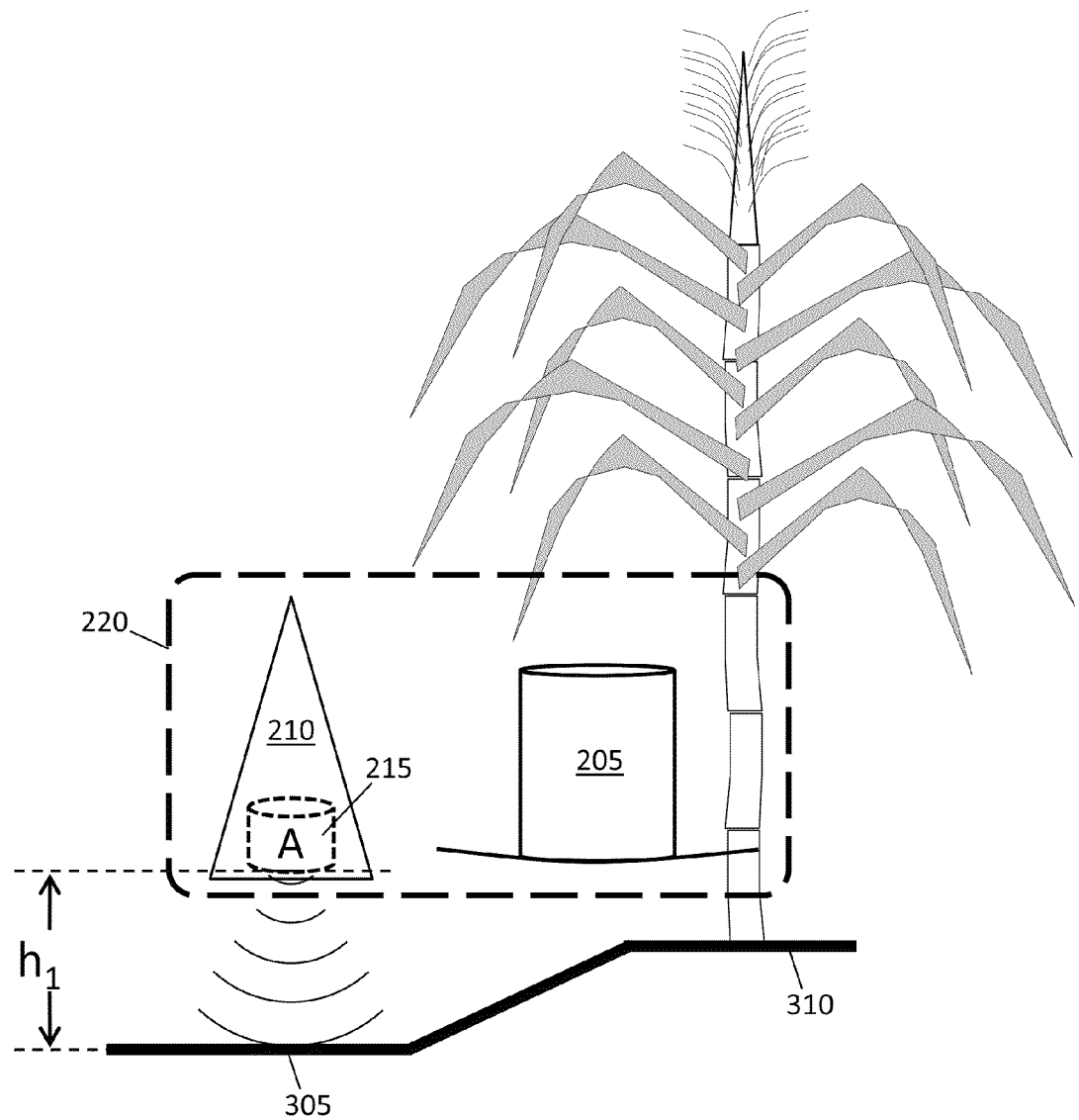
FIG. 3 is a front view of a sugar cane harvesting machine showing a base cutter, crop separator and crop separator ultrasonic height sensor.

FIG. 3 is a front view of a sugar cane harvesting machine showing a base cutter, crop separator and crop separator ultrasonic height sensor. In FIG. 3, base cutter 205, row separator 210, ultrasonic sensor ("A") 215 are indicated as fixed with respect to one another by dashed rectangle 220. Ultrasonic sensor 215 measures the height, $h_1$, of row separator 210 above rut 310 in which the machine's tracks travel. Sugar cane plants grow in furrow 310. In general, furrow 310 is at a different height than rut 305; the furrow may be higher or lower than the rut.

Figure 4:
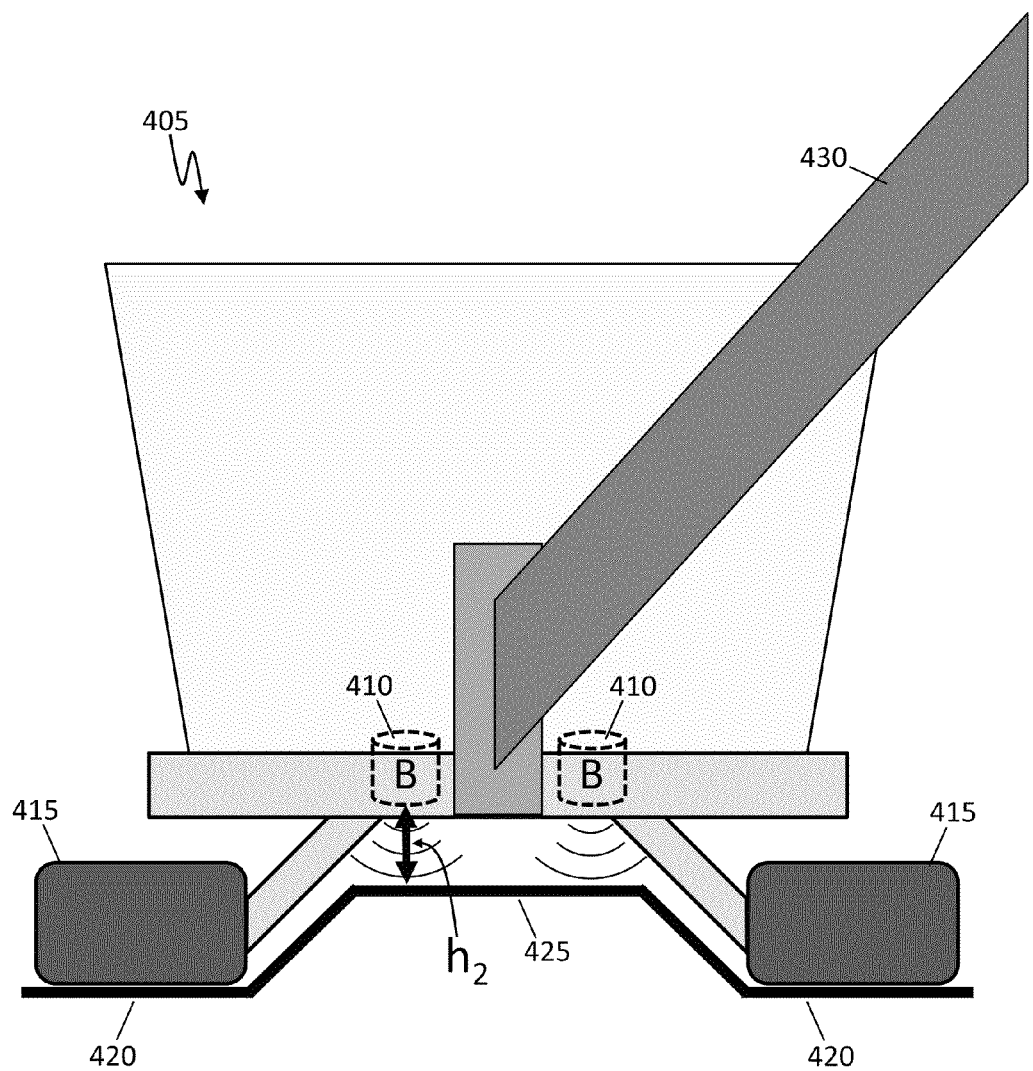
FIG. 4 is a rear view of a sugar cane harvesting machine showing ultrasonic furrow height sensors.

FIG. 4 is a rear view of a sugar cane harvesting machine 405 showing ultrasonic furrow height sensors 410. Machine 405 rides on tracks 415 which travel in ruts 420. Ultrasonic "B" sensors 410 measure the height of machine 405 over furrow 425. These sensors are located at the rear of the machine to minimize contamination from dirt, mud and debris generated by cutting operations. The sensors are mounted close enough to the centerline of the machine to ensure that they measure height above furrow 425 rather than ruts 420. Finally the sensors are placed so that they do not interfere with the movement of elevator 430.

Figure 5:
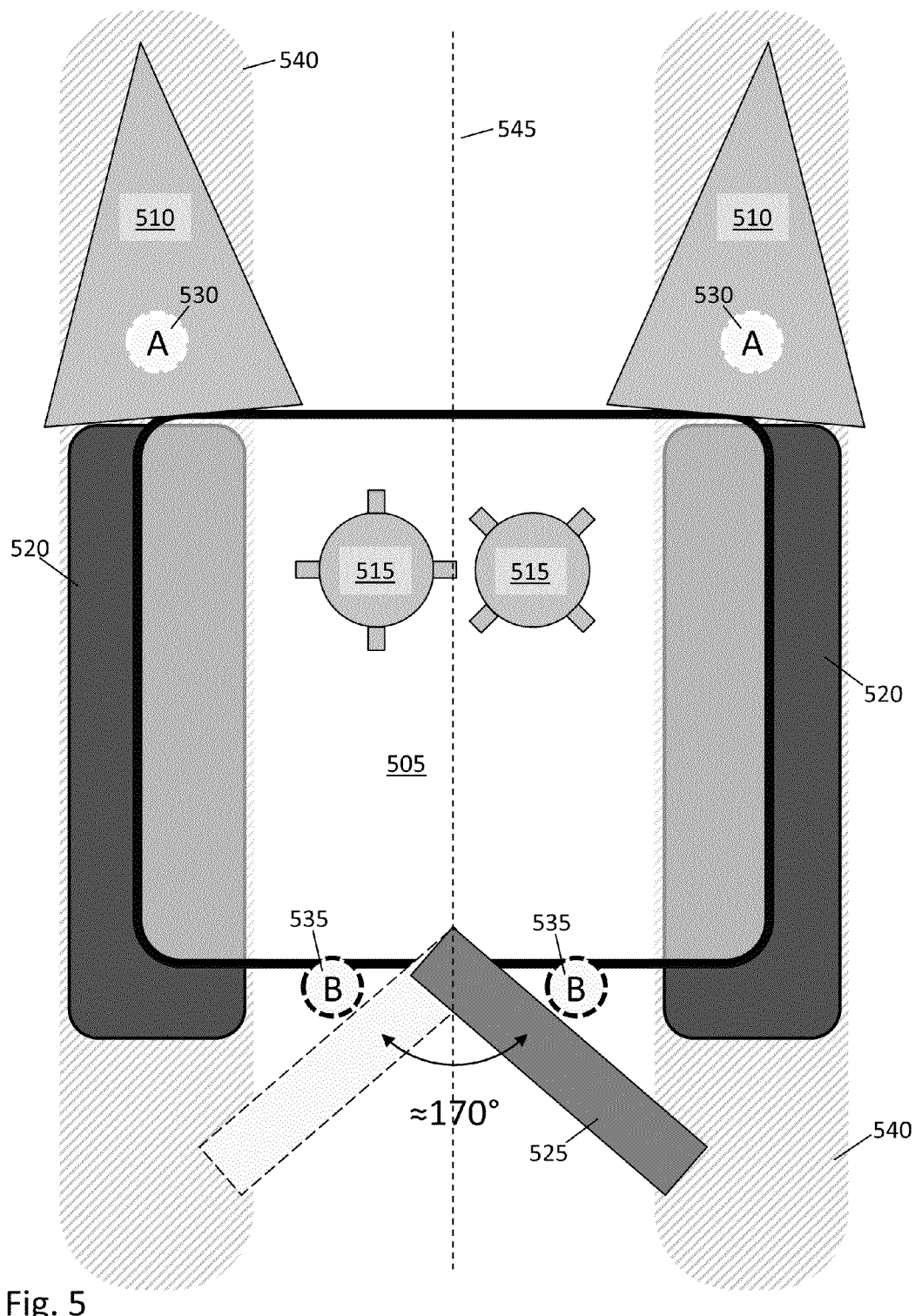
FIG. 5 is a top view of a sugar cane harvesting machine showing ultrasonic height sensor placement.

FIG. 5 is a top view of a sugar cane harvesting machine showing ultrasonic height sensor placement. In FIG. 5, sugar cane harvesting machine 505 includes row separators 510, base cutters 515, tracks 520, and elevator 525. Ultrasonic sensors 530 ("A") are mounted inside or under row separators 510. These sensors measure the height of the base cutters and row separators, which move together as a unit, above ruts 540. Ultrasonic sensors 535 ("B") are mounted at the rear of the machine, out of the way of dirt, mud or other debris generated by the base cutters. The sensors are mounted close enough to centerline 545 to ensure that they measure the height of machine 505 above furrows in a field rather than ruts. Ultrasonic "B" sensors 535 are also mounted to avoid interfering with the movement of elevator 525.

Figure 6A:
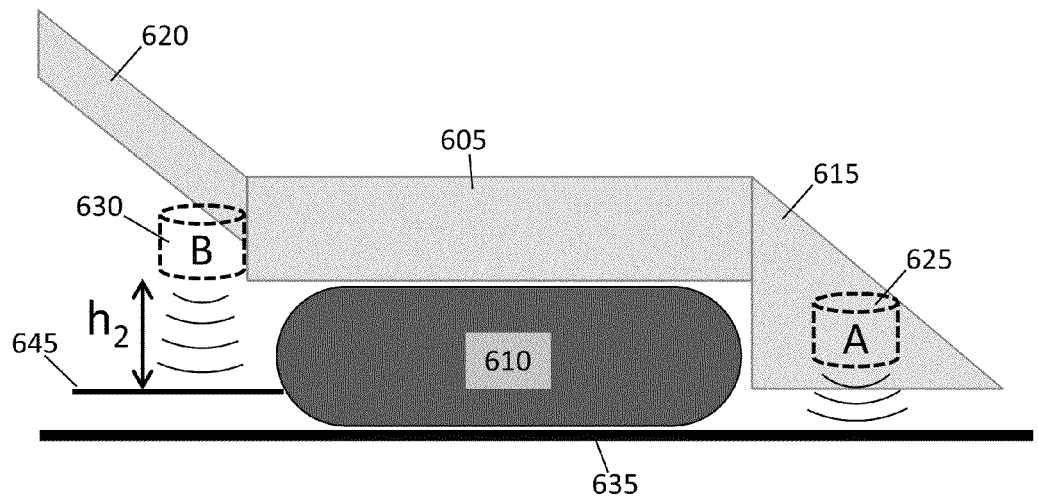
FIGS. 6A and 6B show a sugar cane harvesting machine in hard and soft terrain, respectively.
Figure 6B:
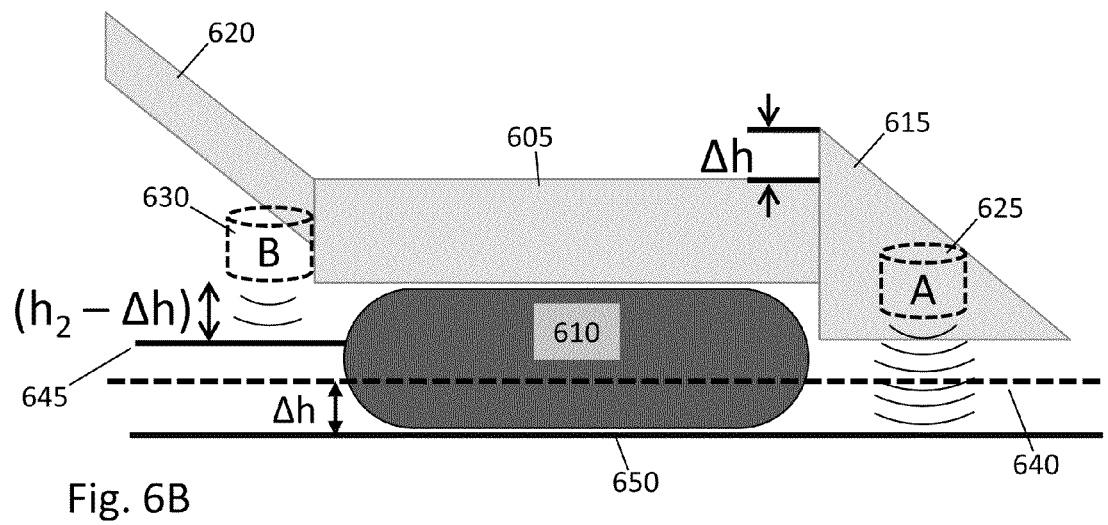

FIGS. 6A and 6B show a sugar cane harvesting machine in hard and soft terrain, respectively. In FIGS. 6A and 6B, sugar cane harvesting machine 605, represented highly schematically, includes tracks 610, row separator/base cutter unit 615, and elevator 620. Ultrasonic "A" height sensors 625 are mounted inside row separator 615 with a clear view of the ground. Ultrasonic "B" height sensors 630 are mounted at the rear of the machine, near elevator 620. In FIG. 6A tracks 610 move along ruts in hard terrain represented by solid line 635. In FIG. 6B the terrain has softened such that tracks 610 have sunk by an amount $\Delta h$ into ruts 650. Dashed line 640 shows the height of the rut in hard ground for comparison.

In FIG. 6A, ultrasonic "A" sensors 625 measure the height, $h_1$, of row separator/base cutter unit 615 above rut 635. A control system maintains height, $h_1$, constant by adjusting hydraulic actuators that position row separator/base cutter unit 615. Ultrasonic "B" sensors 630 measure the height, $h_2$, of machine body 605 above furrow 645. The control system detects sink and lift of the machine in the ruts by monitoring $h_2$.

When the harvesting machine sinks in ruts 635, e.g. transition from situation of FIG. 6A to that of FIG. 6B, the distance measured by ultrasonic "B" sensor 630 decreases from $h_2$ to $(h_2-\Delta h)$. The control system raises row separator/base cutter unit 615 by $\Delta h$. Thus the cutter is raised by the same amount that the tracks sank in the ruts. This keeps the cutter chopping sugar cane at the same place on the cane stalk.

The control system may include an optional pitch sensor. Such a sensor may employ a microelectromechanical system (MEMS) pitch rate gyro, for example. The pitch sensor may be used to improve the operation of cutter height control systems during pitch changes.

Figure 7:
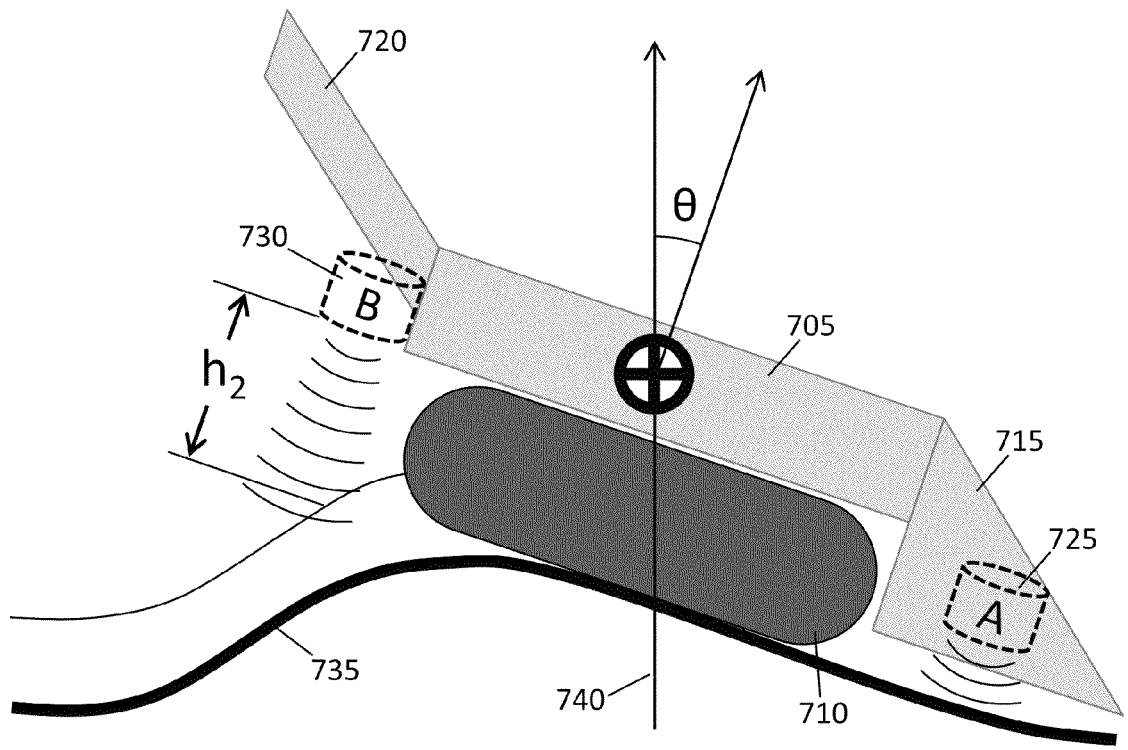
FIG. 7 shows a sugar cane harvesting machine in hilly terrain.

FIG. 7 shows a sugar cane harvesting machine in hilly terrain. In FIG. 7, sugar cane harvesting machine 705, represented highly schematically, includes tracks 710, row separator/base cutter unit 715, and elevator 720. Ultrasonic "A" height sensors 725 are mounted inside row separator 715 with a clear view of the ground. Ultrasonic "B" height sensors 730 are mounted at the rear of the machine, near elevator 720. In FIG. 7 tracks 710 move along ruts in hilly terrain represented by solid line 735. A pitch sensor measures the pitch angle θ of the machine away from vertical 740.

The situation shown in FIG. 7 is intentionally extreme to help illustrate effects that are normally small perturbations in real world scenarios. Sugar cane fields do not have such drastic bumps. Fields may have transitions from level ground to sloping hillsides, however.

The "A" ultrasonic sensors may be mounted as far as 20 or 30 feet ahead of the "B" sensors. When a machine traverses a hill or valley, or transitions between flat and sloping ground, height measurements from the "A" and "B" sensors may become misleading. For example, in FIG. 7, the "B" sensor is over ground that slopes away from the rear of the machine. Height, $h_2$, as measured by the "B" sensor is greater than it would be over flat ground. If a control system interpreted this condition as a lift, e.g. a transition from the situation of FIG. 6B to that of FIG. 6A, then it would try to lower row separator/base cutter unit 715. To prevent this from happening, the control system uses a pitch sensor to differentiate level sink and lift from bumps, valleys and hill transitions. When the pitch of the machine is changing, sink and lift corrections are temporarily suspended.

Figure 8:
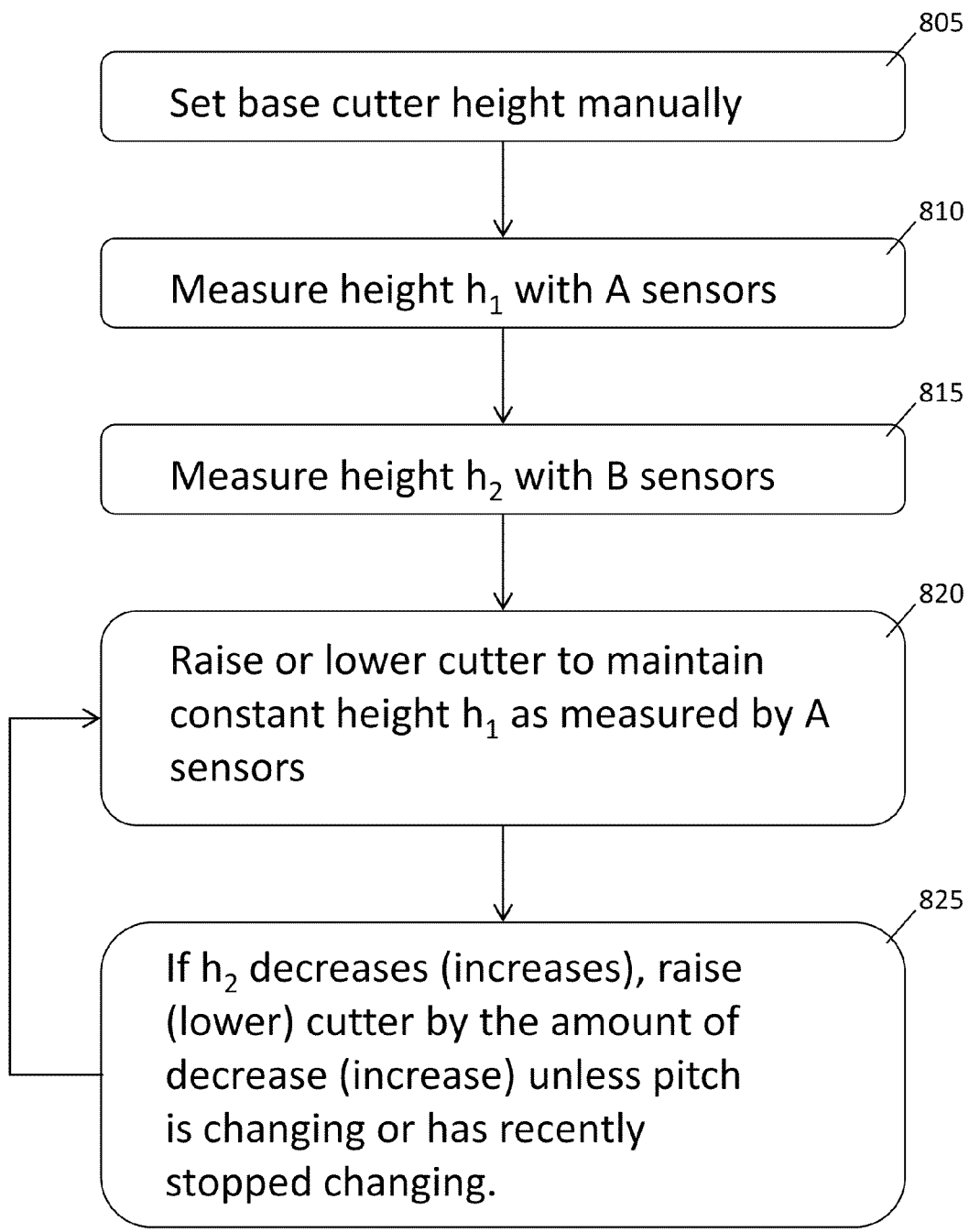
FIG. 8 is a flow chart that outlines a method for automatic base cutter height control for a sugar cane harvesting machine.

FIG. 8 is a flow chart that outlines a method for automatic base cutter height control for a sugar cane harvesting machine. The first step 805 in the method is setting the base cutter height manually. The cutter height may be observed by cutting a few sugar cane stalks and inspecting the ratoons that are left, for example. A machine operator may then make adjustments to the cutter height by inputting nudge up or nudge down commands to raise or lower the height in small increments; e.g. increments between about 3 mm and about 30 mm. Once an appropriate base cutter height has been established, an automatic control system maintains that height during harvesting operations. The operator may input nudge commands to change the height at any time and the system maintains the new height. The automatic control system measures height $h_1$ with the ultrasonic "A" sensors in step 810; see FIGS. 2, 3, 5, 6 and 7, and related description for discussion of $h_1$ and "A" sensor placement. Next, the automatic control system measures height $h_2$ with the ultrasonic "B" sensors in step 815; see FIGS. 4, 5, 6 and 7, and related description for discussion of $h_2$ and "B" sensor placement. As the harvesting machine cuts sugar cane, the base cutter/row separator unit is automatically raised or lowered to maintain $h_1$, as measured by the "A" sensors, constant in step 820.

The effect of harvesting machine sink in soft ground or lift in hard ground is compensated in step 825. If $h_2$ decreases, then the control system raises the base cutter/row separator unit by the same amount. Alternatively, if $h_2$ increases, then the control system lowers the base cutter/row separator unit by the same amount. As discussed in connection with FIG. 7, however, sink and lift corrections are suspended when the machine pitch angle is changing, if pitch angle measurements are available. Sink and lift corrections are also suspended if the pitch angle has recently stopped changing. Here, "recently" means approximately the amount of time for the machine to travel one machine length or about three seconds in typical applications.

In normal operation a control system executes steps 820 and 825 as a loop. Repetitive measurements of $h_1$ and $h_2$ are made by the "A" and "B" sensors, respectively. Further, an operator may input nudge up or nudge down commands to adjust cutter height at any time. Thus, although the flow chart of FIG. 8 gives the impression of a linear step-by-step process, steps 805, 810 and 815 may occur simultaneously and steps 820 and 825 are part of a larger control program.

Top Cutter Control

Figure 9:
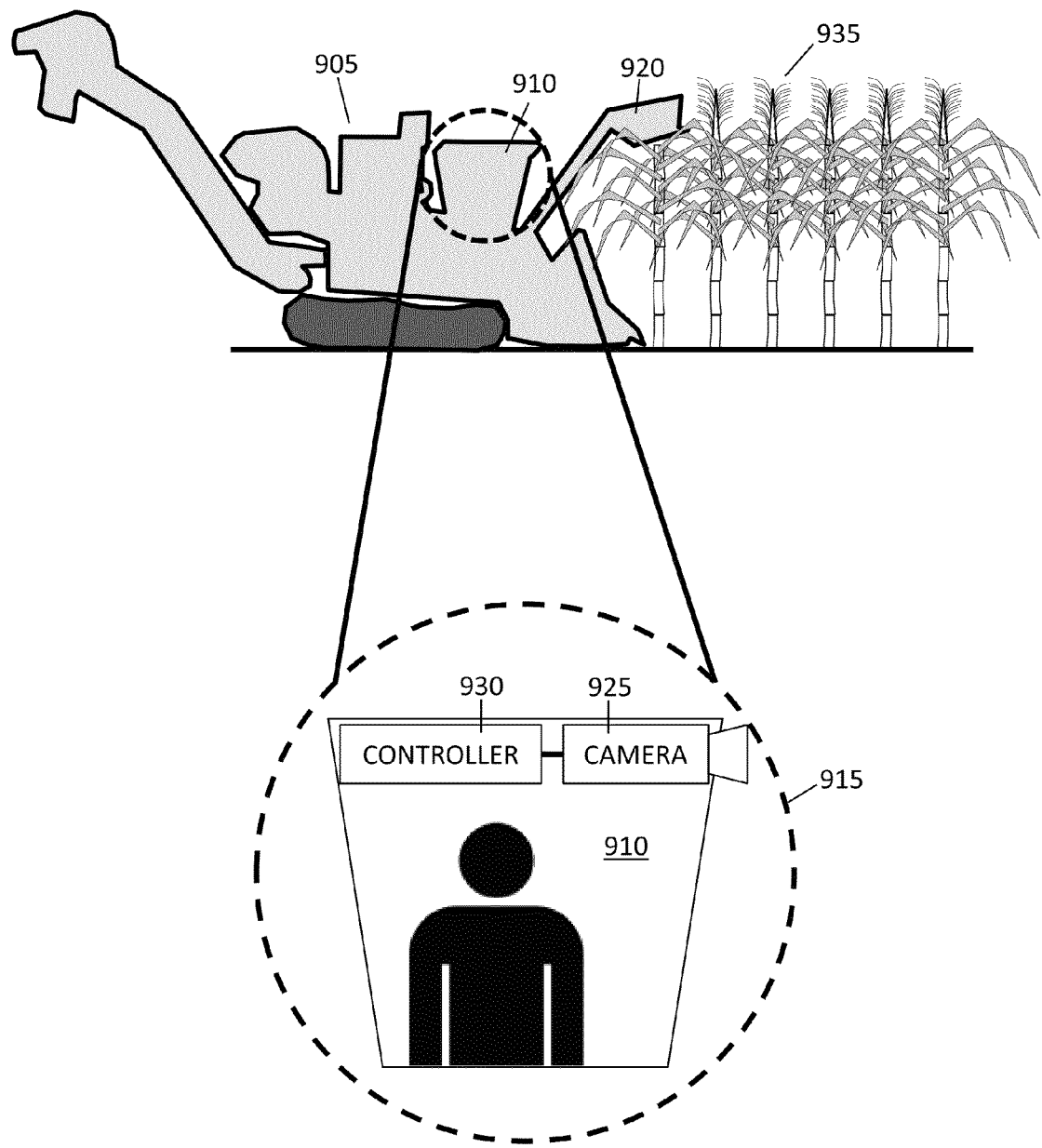
FIG. 9 shows an automatic top cutter height control system for a sugar cane harvesting machine.

FIG. 9 shows an automatic top cutter height control system for a sugar cane harvesting machine. In FIG. 9, sugar cane harvesting machine 905 includes an operator cab 910 which is shown enlarged in dashed circle 915. Top cutter 920 cuts the tops off sugar cane stalks 935. Inside cab 910, camera 925 captures images of sugar cane plants 935 and sends the images to controller 930. The controller analyzes images from the camera and adjusts top cutter height to cut the tops off of sugar cane plants at the same relative position on the plant. In an alternate embodiment, camera 925 may be mounted on top cutter 920 or on the arm that supports the top cutter.

Figure 10:
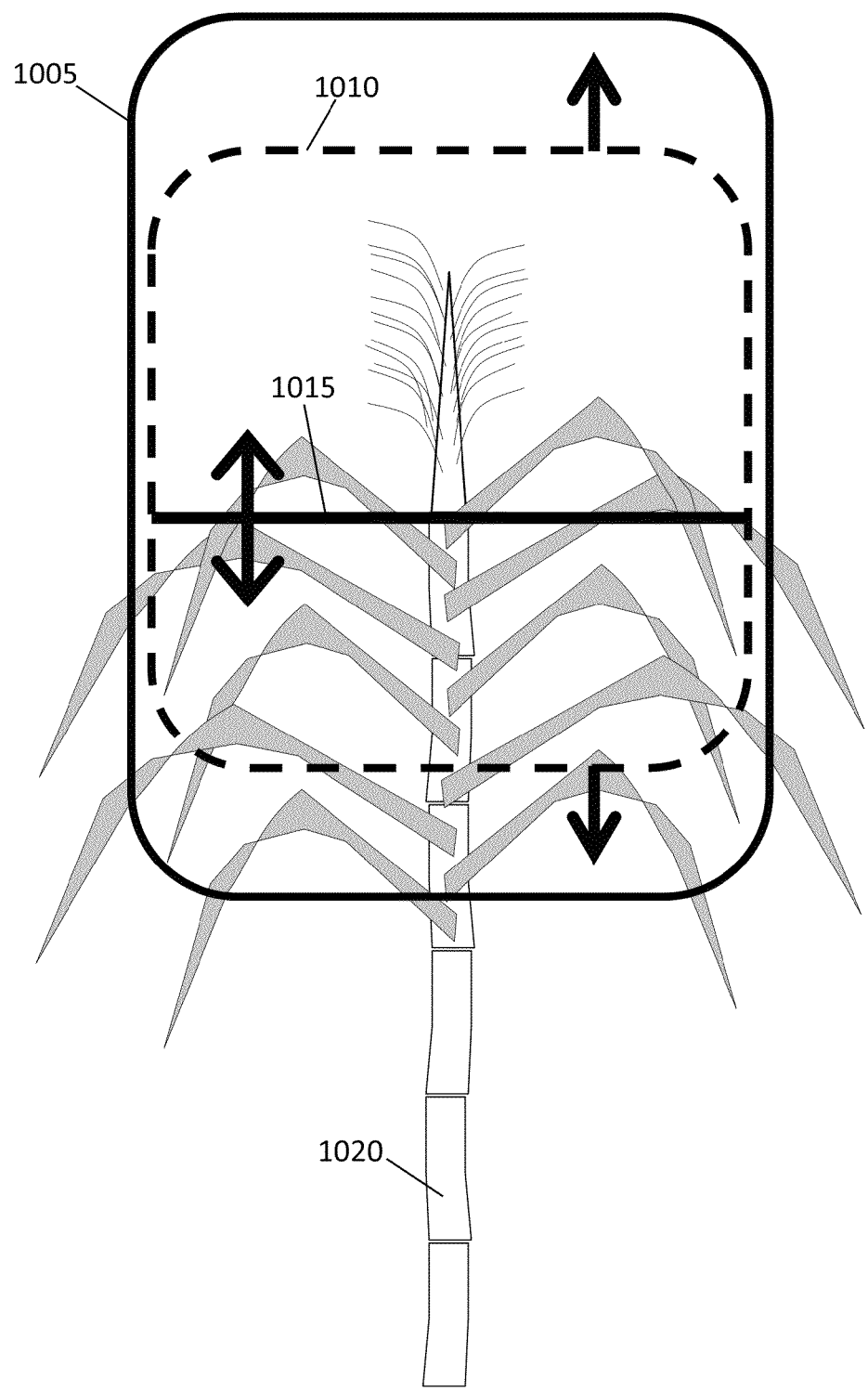
FIG. 10 shows camera field of view, auto tracking window and operator adjustable cutter height reference line for an automatic top cutter height control system.

FIG. 10 shows camera field of view, auto tracking window and operator adjustable cutter height reference line for an automatic top cutter height control system. In FIG. 10, rectangle 1005 represents the field of view of a camera such as camera 925 in FIG. 9. In FIG. 10, field of view 1005 encompasses the top of sugar cane plant 1020. A controller, e.g. controller 930 in FIG. 9, calculates auto tracking window 1010 and may show such a window on a display to an operator. The tracking window is calculated to track a specific region of a sugar cane plant. For example, the tracking window may track the transition from green top leaves to brown leaves surrounding a cane stalk. Or it may track the change in shape between the stalk and the top, flowering part of a plant. A machine operator sets the top cutter height manually, and as long as the manually selected height is within the tracking window, it is maintained automatically by the controller. The selected top cutter height within the tracking window is represented by line 1015.

Figure 11:
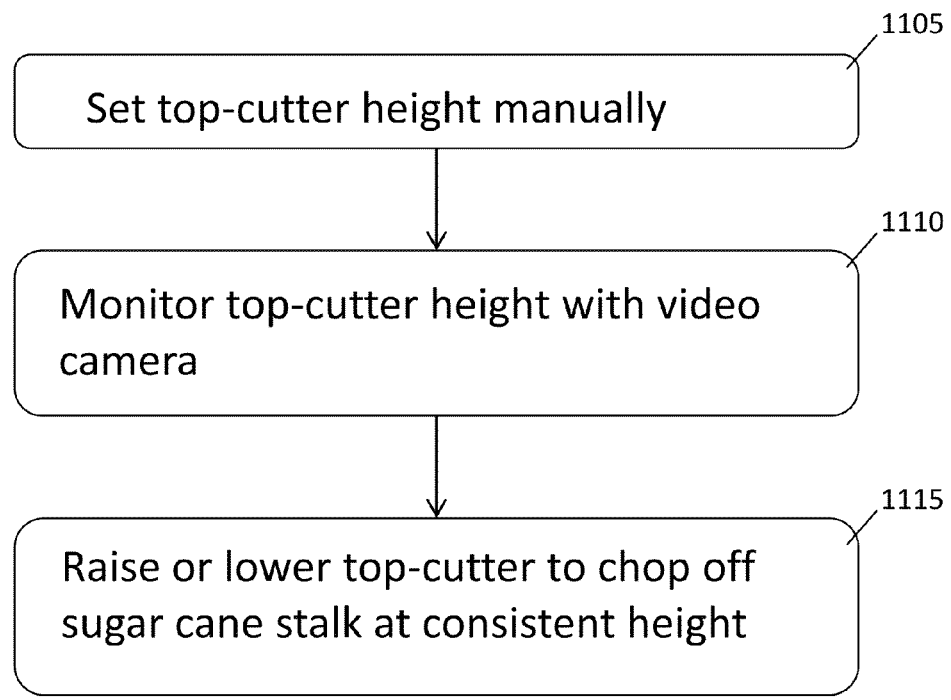
FIG. 11 is a flow chart that outlines a method for automatic top cutter height control for a sugar cane harvesting machine.

FIG. 11 is a flow chart that outlines a method for automatic top cutter height control for a sugar cane harvesting machine. In FIG. 11, setting top cutter height manually is step 1105. An experienced operator adjusts the top cutter to a desired height and the automatic system maintains that height with respect to plant features. In step 1110 a camera monitors the top cutter height. Finally, the top cutter is raised or lowered in step 1115 to maintain top cutting at a consistent height with respect to plant features, such as the transition from brown cane stalk to green leaves.

Conclusion

Figure 12:
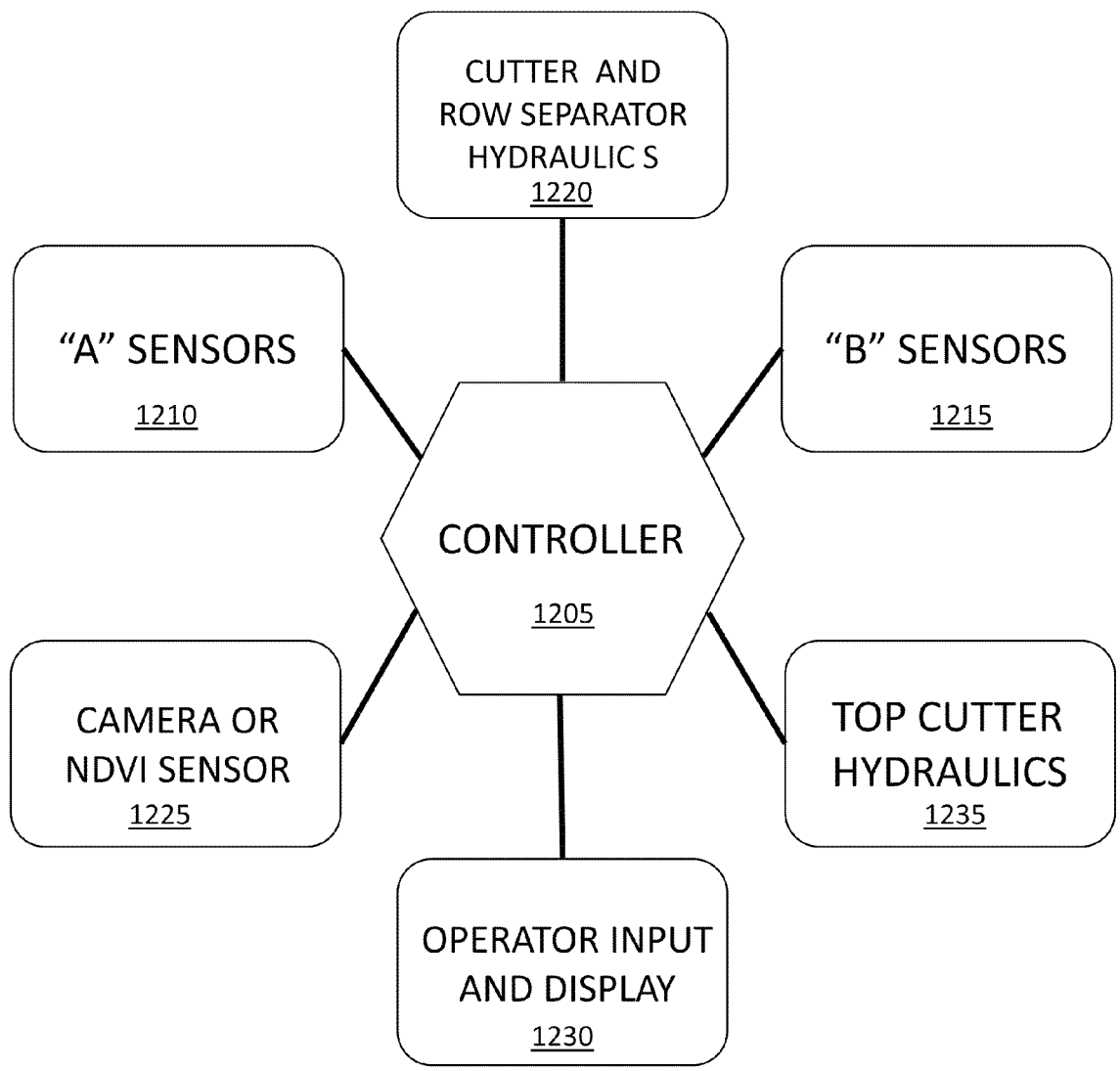
FIG. 12 is a block diagram for a sugar cane harvester automatic cutter height control system.

FIG. 12 is a block diagram for a sugar cane harvester automatic cutter height control system. The system provides for automatic control of top and/or base cutting heights. In each case, an operator sets an initial desired cutting height and the system maintains that height. A base cutter control system maintains a base cut height above a furrow. A top cutter control system maintains a top cut height in relation to plant features such as leaf color or plant shape. Top cutter control components are optional if only base cutter control is desired and vice versa.

In FIG. 12, controller 1205 includes a processor that interprets sensor data, camera images and operator input, adjusts cutter heights through hydraulic actuators, and displays information to an operator on a display. The controller may also include a pitch sensor to measure the pitch angle of a harvester. "A" 1210 and "B" 1215 height sensors are ultrasonic sensors that measure height above ground. Base cutter/row separator hydraulics adjust the height of the base cutter/row separator unit. Camera 1225 captures images of sugar cane plants as input for top cutter control. Operator input and display 1230 allow an operator to set initial cut heights and adjust them at any time. Finally, top cutter hydraulics 1235 adjust the height of a top cutter.

As an alternative, camera 1225 may be replaced by an NDVI (Normalized Difference Vegetation Index) sensor to differentiate between green plant tops and brown stalks. NDVI sensors have proven to be robust in applications such as spot weed spraying where quick identification of green plant material is needed.

Suitable ultrasonic sensors for the "A" and "B" sensors described above are readily available from commercial sources. Ultrasonic sensors having an adjustable detection threshold are preferred as they may be adjusted to reject small amounts of vegetative clutter on the ground thus allowing the sensor to measure the distance to the soil surface.

As an alternative, "A" and "B" sensors may be based on microwave, optical or mechanical sensing mechanisms. Such alternatives may be preferred when harvesting crops other than sugar cane, for example.

The sugar cane harvester automatic cutter height control systems described herein maintain consistent cutter heights even as a harvesting machine traverses changing field conditions. After an operator chooses an initial cutting height the automatic systems maintain that height even as conditions change. Base cutter height is maintained constant above the ground while top cutter height is maintained constant with respect to plant features.

The above description of the disclosed embodiments is provided to enable any person skilled in the art to make or use the disclosure. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A harvester base cutter control system comprising:
   a first height sensor mounted in a row separator of a harvester to measure a height of a base cutter/row separator unit above a rut traversed by tracks or wheels of the harvester;
   a second height sensor mounted at the rear of the harvester to measure a height of the harvester above a furrow between the tracks or wheels;
   a hydraulic system to raise or lower the base cutter/row separator unit with respect to the harvester; and,
   a controller that interprets sensor data and adjusts base cutter/row separator height via the hydraulic system to maintain a constant base cutter height above the furrow.

2. The system of claim 1, the first and second height sensors being ultrasonic height sensors.

3. The system of claim 1, the controller comprising a pitch sensor that measures a pitch angle of the harvester.

4. A method of maintaining constant base cutter height in a harvester comprising:
   providing a first height sensor mounted in a row separator of a harvester;
   providing a second height sensor mounted at the rear of the harvester;
   using the first height sensor to monitor a height, $h_1$, of a base cutter/row separator unit above a rut traversed by tracks or wheels of the harvester;
   using the second height sensor to monitor a height, $h_2$, of the harvester above a furrow between the tracks or wheels;
   raising or lowering the base cutter/row separator unit to maintain height, $h_1$, constant;
   if height, $h_2$, decreases by an amount, $\Delta h$, raising the base cutter/row separator unit by $\Delta h$; and,
   if height, $h_2$, increases by an amount, $\Delta h$, lowering the base cutter/row separator unit by $\Delta h$.

5. The method of claim 4, the first and second height sensors being ultrasonic height sensors.

6. A method of maintaining constant base cutter height in a harvester comprising:
   providing a first height sensor mounted in a row separator of a harvester;
   providing a second height sensor mounted at the rear of the harvester;
   providing a pitch sensor to monitor a pitch angle of the harvester;
   using the first height sensor to monitor a height, $h_1$, of a base cutter/row separator unit above a rut traversed by tracks or wheels of the harvester;
   using the second height sensor to monitor a height, $h_2$, of the harvester above a furrow between the tracks or wheels;
   raising or lowering the base cutter/row separator unit to maintain height, $h_1$, constant;
   if the pitch angle is changing or has been constant for less time than the harvester takes to traverse a distance equal to a separation between the first and second sensor, then ignoring changes in height, $h_2$; and,
   otherwise: if height, $h_2$, decreases by an amount, $\Delta h$, raising the base cutter/row separator unit by $\Delta h$, and, if height, $h_2$, increases by an amount, $\Delta h$, lowering the base cutter/row separator unit by $\Delta h$.

7. The method of claim 6, the first and second height sensors being ultrasonic height sensors.

* * * * *